United States Patent [19]
Choudhury et al.

[11] 4,391,028
[45] Jul. 5, 1983

[54] SOLVENTLESS ASSEMBLY OF FLEXIBLE TUBING TO A COMPONENT

[75] Inventors: Hrishikesh Choudhury, Gurnee, Ill.; Juergen H. Zaha, Moore, S.C.

[73] Assignee: Abbott Laboratories, North Chicago, Ill.

[21] Appl. No.: 315,076

[22] Filed: Oct. 26, 1981

[51] Int. Cl.³ .................. B23P 19/00; B29C 17/00; B29C 25/00
[52] U.S. Cl. ........................................ 29/235; 29/447; 62/293; 62/331; 62/384; 62/514 R; 264/28; 264/230; 425/392
[58] Field of Search ............... 264/28, 230; 425/507, 425/383, 392; 29/447, 235; 62/293, 331, 384, 514 R

[56] References Cited
U.S. PATENT DOCUMENTS 1,913,198 6/1933 Geyer .................................. 29/436
2,422,065 6/1947 Anselmi .............................. 29/235
3,281,929 11/1966 Buslaff ............................... 29/235
3,523,492 8/1970 Bruce et al. ....................... 29/235

FOREIGN PATENT DOCUMENTS 503565 4/1939 United Kingdom ................ 29/235

Primary Examiner—Willard E. Hoag
Attorney, Agent, or Firm—Neil E. Hamilton; Robert L. Niblack

[57] ABSTRACT

An apparatus for facilitating assembling a length of flexible tubing on a component part which avoids the use of sealing solvents yet affords a secure placement of the tubing thereon. The apparatus and method assures a secure fitment by stretching the tubing to a predetermined dimension which is larger than the outside dimension of the portion on which the tubing is to be placed on the component part, and while in such a position the tubing is temporarily frozen by means of a coolant. An important feature in stretching the tubing to the enlarged dimension is in assuring that it is done in a uniform manner and that the stretched walls are substantially parallel to each other. This is effected by utilizing a parallel motion of jaw members which are placed within the tubing to stretch it to its expanded state. With the tubing frozen in the expanded state, it is then placed on that portion of the commodity as it normally would be and the tubing allowed to return to room temperature whereby it will attempt to assume its original diameter.

10 Claims, 12 Drawing Figures

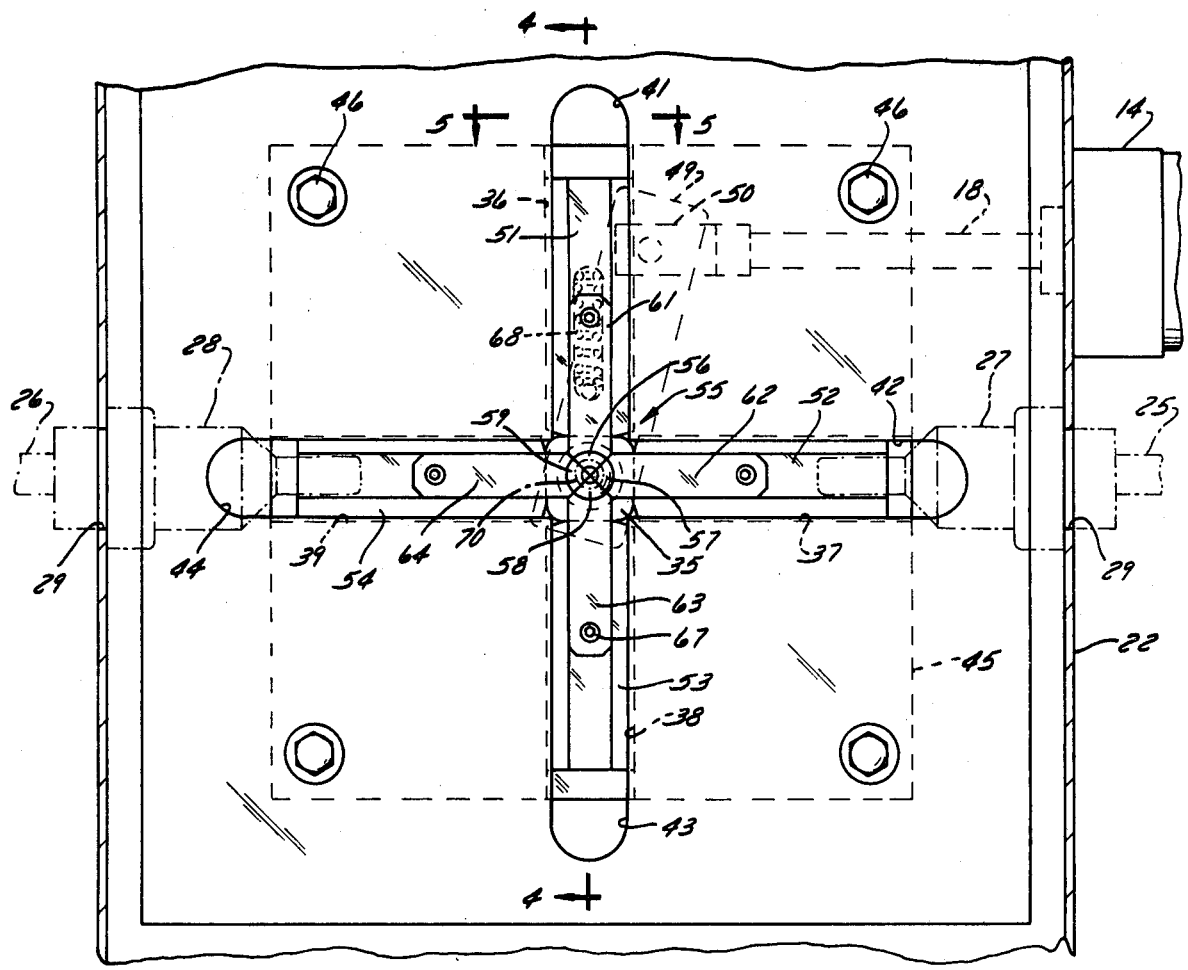

SOLVENTLESS ASSEMBLY OF FLEXIBLE TUBING TO A COMPONENT

BACKGROUND OF THE INVENTION

This invention relates to an apparatus for assembling a length of flexible tubing onto a component part. More particularly, it relates to an apparatus for securing a length of flexible I.V. tubing to a component in an I.V. set without the use of solvents, the method employing a uniform stretching of the tubing, a freezing thereof and a placement of the tubing on the component part after which the tubing is allowed to return to room temperature. The method and apparatus results in an attachment which is more secure than one normally effected utilizing a solvent.

In the assembly of an I.V. administration set, it is common practice to attach a length of flexible tubing to a component in the set such as a filter, needle adapter or a drip chamber. By placing the tubing in a solvent for the tubing and while in a partially dissolved state, the tubing is fitted onto the component and the solvent will then effect a fusing of the surfaces of the tubing and the commodity. A problem which arises in utilizing a solvent bond is the possibility of some residual solvent vapor remaining in the I.V. set, if not properly primed prior to administration. Another problem in utilizing a solvent-type bonding of this type is that an extra step must be taken during the procedure in order to remove excess solvent as well as the problem in attempting to force-fit a slightly smaller diameter tubing over a commodity which has a slightly larger external diameter.

One solventless method for securing a component to flexible tubing employs jaw members to expand the tubing with a portion of the component being placed in the expanded tubing. Placement of the component is through the center of the expanded jaws.

The prior art does not provide a method of solventless sealing of flexible tubing to a component which will afford a secure fitment of the tubing to the commodity and do so in a manner which requires few materials and a minimum amount of cost. Those apparatus which do not employ solvents and utilize jaws to expand the tubing have created problems in effecting a nonuniform stretching of the tubing. This is caused by the jaws opening in a nonparallel or duck-bill type movement, thus creating a greater stretching of the tubing at the mouth of the jaws than at the inner end.

It is an advantage of the present invention to provide an apparatus for securing a length of flexible tubing to a commodity without the use of a solvent. Other advantages are a method and apparatus for solventless sealing of flexible tubing to an I.V. component which affords consistently good sealing between the tubing and the component, effects a sealing between a length of flexible tubing and the components such that it is adapted to a fast and efficient operation, accomplishes a securing of polyvinylchloride tubing to a rigid plastic component without the introduction of an additive component; and a method and apparatus for placing a length of I.V. tubing on an I.V. component which does not appreciably add to the cost of the set.

SUMMARY OF THE INVENTION

The foregoing advantages are accomplished and the shortcomings of the prior art are overcome by the present apparatus for securing a length of flexible plastic tubing to a component without the use of a solvent or adhesive. The apparatus employs a multiplicity of jaw members, each having a longitudinal portion and dimension to fit within the length of the tubing. Guide means are provided to radially direct the jaw members from a closed position to a position spaced therefrom while maintaining a parallel relationship with respect to the jaw members. A moving means is associated with the jaw members to move the jaw members from the closed position to the spaced-apart position. In addition, nozzles are positioned adjacent the jaw members to introduce a cooling media having a temperature to temporarily freeze the length of tubing in an expanded state when contacted with the jaws in the spaced-apart position. With the tubing expanded in the previously described frozen state, it is placed over the portion of the commodity to which it is to be secured. Upon allowing the plastic tubing to reach room temperature, it will then attempt to return to its original position to thereby be secured thereon. A length of tubing is chosen such that its internal diameter is slightly less than the outside diameter to the commodity to which it is to be secured. In a preferred manner, the means to radially guide the jaw members from a closed position to an open or spaced-apart position is a slotted guide plate having bar members for each jaw member arranged for reciprocal movement in the slotted guide plate. Suitable means are provided to mount each jaw member to the bar member. A preferred means for moving the jaw members from the closed to the open position is a crank arm and a drive head which upon having imparted a rotary motion thereto will move the bar members away from each other when the crank arm is rotated. The preferred driving means for rotating the crank arm is a standard air cylinder with a reciprocating piston. Preferably, four jaw members are utilized and each has a body section with a large dimensional portion and a small dimensional portion spaced outwardly from the block members which secure them to the bar members. Preferably, carbon dioxide is employed as the coolant material for freezing an expanded plastic tubing in its expanded state and a shroud surrounds the nozzles and the jaws for the purpose of venting the spent coolant material.

BRIEF DESCRIPTION OF THE DRAWINGS

A better understanding of the present assembly apparatus and the method of this invention will be had by reference to the drawings wherein:

FIG. 3 is an enlarged detail view of the jaw members and the slots for guiding them with the jaws in a closed position.

FIG. 4 is a view in vertical section taken along line 4—4 of FIG. 3.

FIG. 5 is a top partial view taken along line 5—5 of FIG. 3.

DETAILED DESCRIPTION OF A PREFERRED EMBODIMENT

Figure 1:
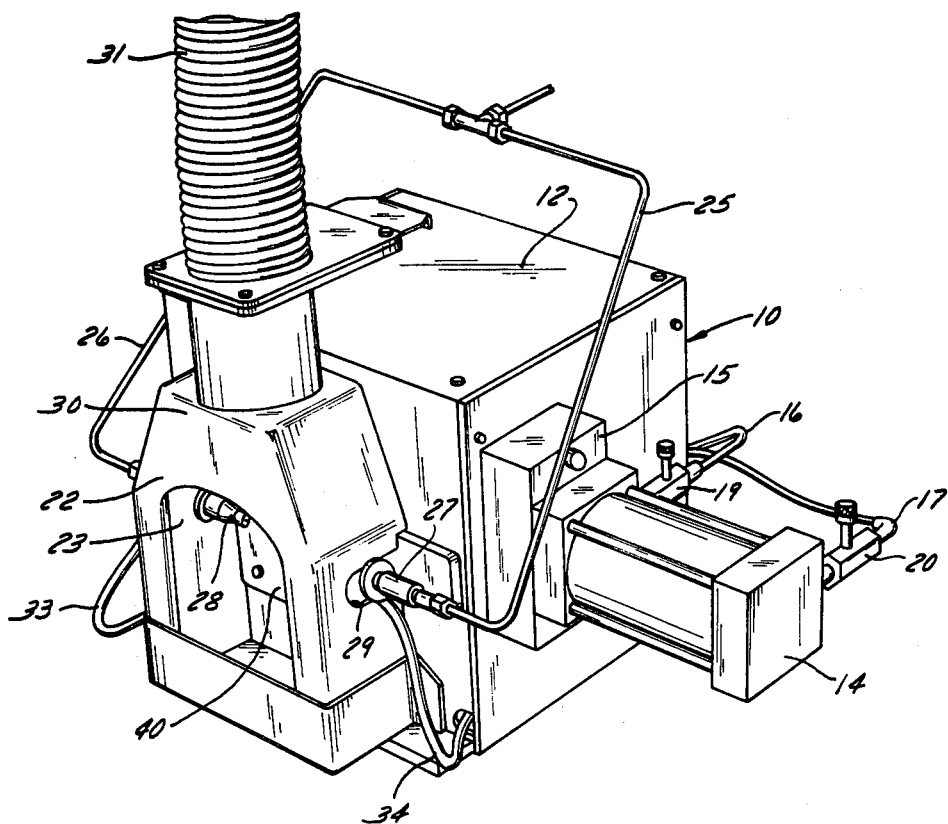
FIG. 1 is a perspective view of the novel apparatus of this invention.
Figure 2:
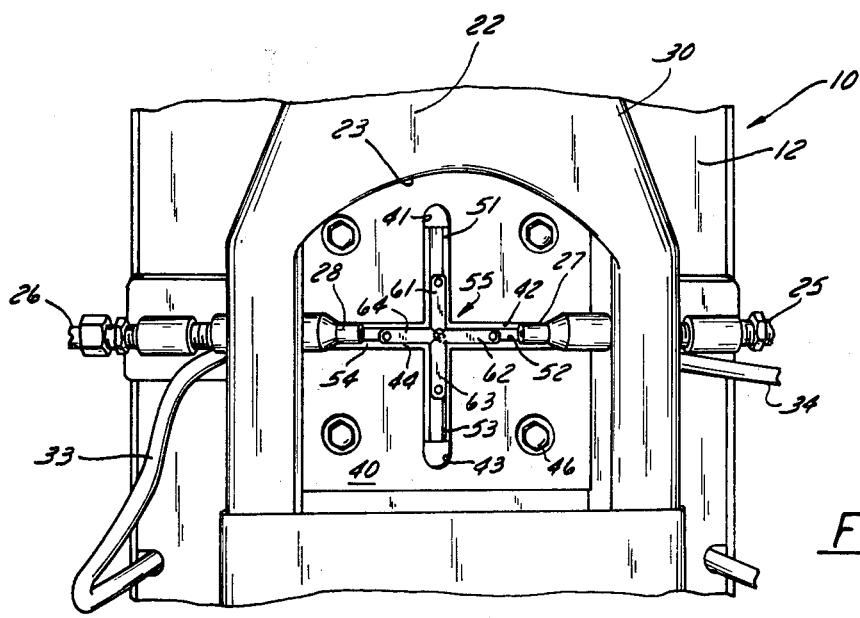
FIG. 2 is a partial front view thereof illustrating the jaw members as well as the coolant nozzles.

Proceeding to a detailed description of the present apparatus and method of this invention, the novel assembly apparatus is indicated generally by the numeral 10 and includes a substantially square housing 12 to which is operably affixed an air cylinder 14 through a mounting block 15. The usual air supply lines 16 and 17 are interconnected with the air cylinder through connectors 19 and 20. A shroud 22 encloses a front portion of housing 12 and has an opening 23 for purposes of gaining access to jaw members 55 as indicated in FIG. 2. Two fluid lines 25 and 26 carry a coolant material to nozzles 27 and 28 which are adjustably positioned in shroud 22 by means of slots such as 29. A vent housing 30 forms a top portion of the shroud to which is secured a vent duct 31. For purposes of controlling the spray of the nozzles, two electrical conduit lines 33 and 34 are connected thereto for electronic contact.

As best seen in FIG. 2, a slotted guide plate 40 has four slots 41, 42, 43 and 44 arranged in the form of a cross into which are slidably positioned four bar members 51, 52, 53 and 54 and carry block members 61, 62, 63 and 64. The block members are integrally formed as a part of four jaws 56, 57, 58 and 59 as will be best seen in FIGS. 9 and 10.

Figure 6:
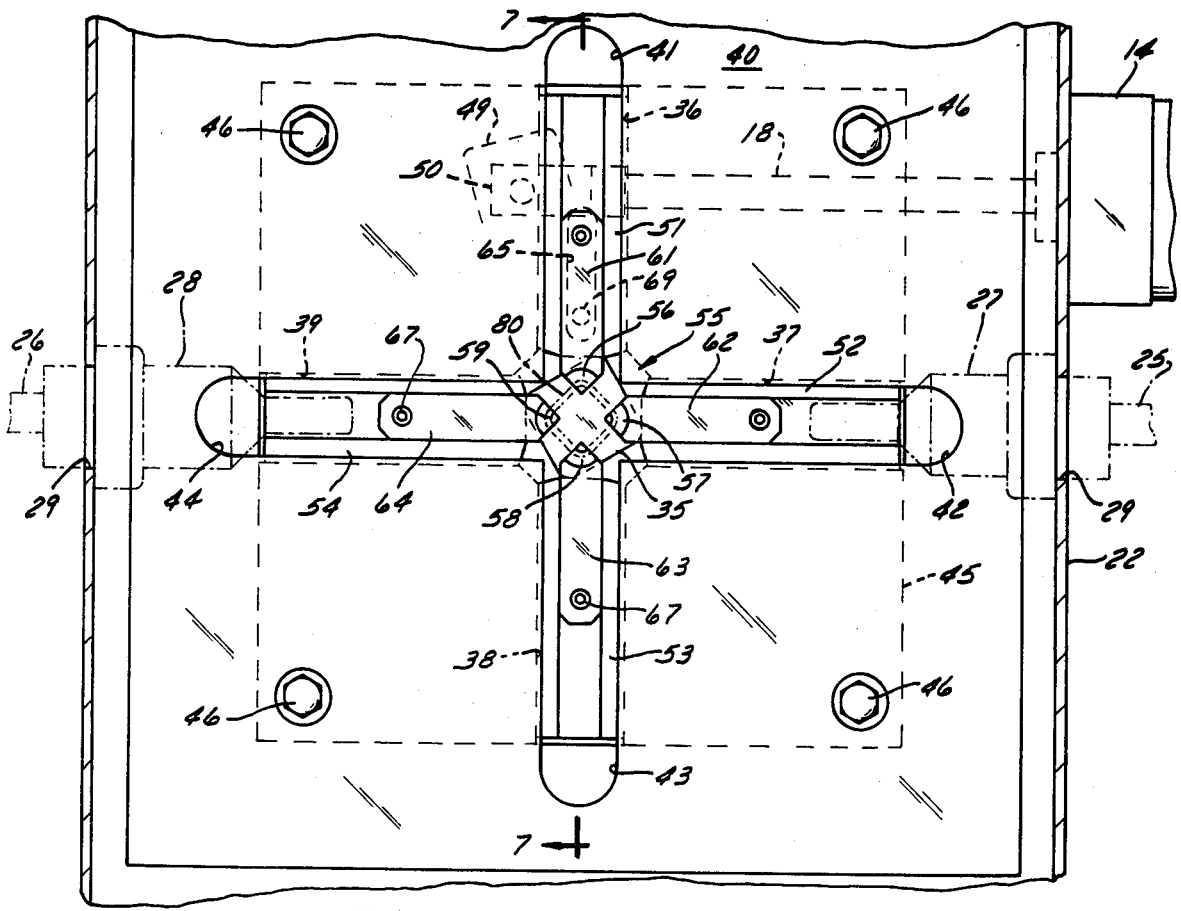
FIG. 6 is a view similar to FIG. 4 with a portion of the apparatus broken away and showing the apparatus in a position to expand the jaws.

FIGS. 3 and 6 illustrate the slotted retention of the jaws 55 in slots 41, 42, 43 and 44 being formed in guide plate 40 as well as compartments 36, 37, 38 and 39 in base plates 45. As shown in these figures, as well as FIGS. 4 and 7, the compartments in the base plate 45 will be slightly wider than the slots in guide plate 40 so that the bar members 51, 52, 53 and 54 will be captive therein. Mounting bolts such as 46 will secure the cover slotted guide plate 40 to the base plate 45.

Figure 7:
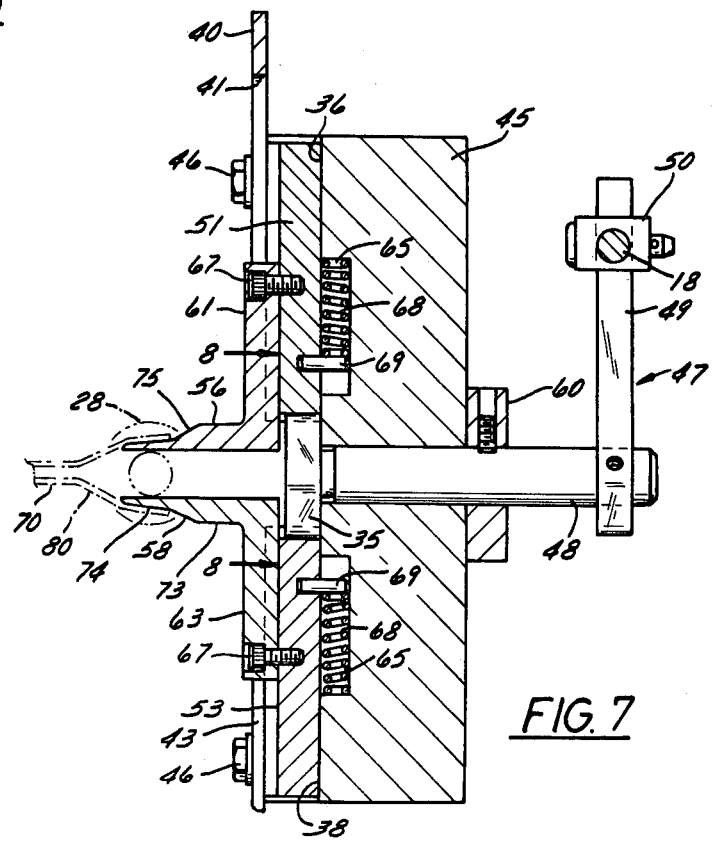
FIG. 7 is a view taken in vertical section along line 7—7 of FIG. 6.

FIGS. 4 and 7 show the drive means for opening and closing jaws 56-59. A centrally positioned shaft 48 extends through and is journaled in base plate 45. It has a substantially rectangular cam head 35 for contact with the ends of bar members 51, 52, 53 and 54. Cam head 35 and shaft 48 form a portion of a crank arm assembly generally 47 with crank arm 49 extending from shaft 48 and interconnected to rod 18 of air cylinder 14 through connector 50. Shaft 48 will be suitably positioned and hold head 35 in the proper place through screw plate 60. Base plate 45 includes cavities 65 for housing springs 68 which will contact a biasing bar 69 on each of the bar members 51, 52, 53 and 54. The block members 61-64 and each jaw 56-59 are secured to the bar members 51-54 through screws such as 67.

Figure 9:
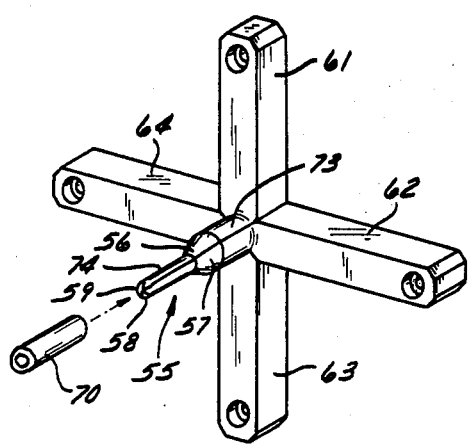
FIG. 9 is a perspective view illustrating the jaw members utilized in the assembly apparatus.
Figure 10:
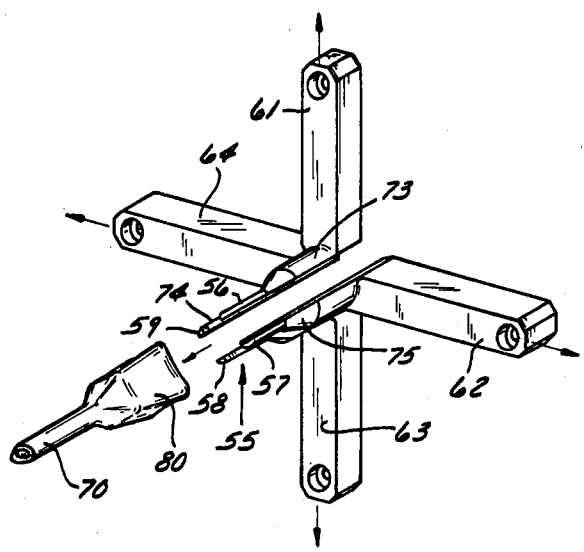
FIG. 10 is a view similar to FIG. 9 except showing the jaws in the expanded position and with the tubing in a configuration after it has been expanded by the jaws.

As best seen in FIGS. 9 and 10, jaw members 55 include jaws 56, 57, 58 and 59. These jaws are pie-shaped in cross section so that when they are positioned together such as shown in FIG. 9, their exterior surfaces will provide a rounded surface so as to fit inside the length of tubing 70. It will also be noted that the jaws have a large dimensional section 73 adjacent the block members 61-64 and a smaller dimensional section 74 for placement inside tubing 70.

OPERATION

Figure 8:
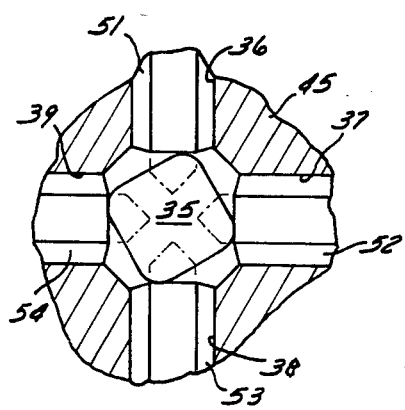
FIG. 8 is a partial detail view taken along line 8—8 of FIG. 7.
Figure 11:
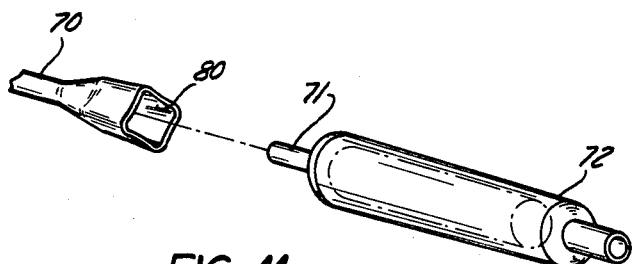
FIG. 11 is a perspective view showing the expanded tubing in alignment for placement on a section of an I.V. component.
Figure 12:
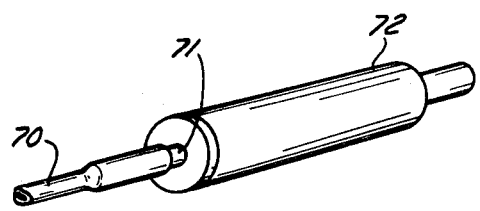
FIG. 12 is a perspective view illustrating the assembly of a length of tubing on the component shown in FIG. 11.

A better understanding of the advantages of the assembly apparatus as well as the method of this invention will be had by a description of the operation of the apparatus 10. A length of tubing 70 will be selected which will have an inside diameter slightly smaller than the outside diameter of connecting portion 71 of commodity 72 such as a filter device. The jaws 55 of unit 10 will be in a closed position such as shown in FIGS. 4 and 9. The tubing 70 will be fitted over the closed jaws 56, 57, 58 and 59 to a position whereby the tubing will contact the intermediate section 75 on the jaws. When in this position, air cylinder 14 will be activated so that rod 18 will be moved outwardly and away therefrom from a position indicated in broken lines in FIG. 3 to that shown in FIG. 6. During this movement head 59 will turn from a position indicated in FIGS. 3 and 4 to that shown in FIGS. 6, 7 and 8. Due to the square configuration of head 59 and the substantially straight ended portions of bar members 51-54, this will effect an outward movement thereof which in turn will move the jaws outwardly to a position as indicated in FIGS. 7 and 10. In this position the end portion of the tubing will be expanded into a somewhat rectangular-like compartment 80. While in this position coolant material in the form of carbon dioxide will flow through lines 25 and 26 and out of nozzles 27 and 28 to freeze the tubing in this position. Excess coolant will flow out through vent housing 30 and vent 31. Air cylinder 14 will again be activated to return arm 18 to the position indicated in FIG. 3 to thereby release contact of the jaws from inside tubing 70. Tubing 70 will be moved away from the jaws with the compartment 80 formed as illustrated in FIG. 11. In this position it will be fitted over connecting portion 71. Upon being permitted to warm to room temperature the tubing will attempt to assume its original shape and be connected to portion 71 as indicated in FIG. 12.

During the previously described interconnection of the tubing 70 to the commodity 72 an important feature is in the fact that jaws 56-59 assume a parallel position as they expand the tubing. This creates a uniform stretching of the tubing along the length of the portion that is stretched. Conventional methods stretch tubing for placement over a connecting section wherein the outward portion is stretched to a greater degree than the inner portion as normally happens when a duck-bill type device would be used similar to the jaws on a pair of pliers. The uniform stretching effected by this invention assures a rigid connection as well as one which can be repeated with a large number of parts. The connection provided by the apparatus and method of this invention will survive a higher pull test than conventional solvent bonding.

In the description of apparatus 10 and the method herein, polyvinylchloride or polyurethane tubing is the preferred composition of tubing which is utilized. It will be appreciated that other types of flexible tubing including rubber and plastic could be employed. Commodity 72 is a filter device the housing of which is fabricated from a resinous plastic material with the connecting portion being rigid. The apparatus of this invention will operate as effectively with components made from other materials such as rigid metals. While carbon dioxide is the preferred gaseous cooling medium to freeze the tubing in the expanded position, other coolant materials such as liquid or gaseous nitrogen could be employed. The obvious requirement is that contact with the gas be of a sufficient period of time in order to effect a freezing of the expanded tubing. In the preferred embodiment, two nozzle members are oppositely positioned with respect to jaw members 55. Any placement or number of the coolant nozzles could be utilized including an annular member with a multiplicity of apertures. While electrical lines 33 and 34 are disclosed for the purpose of controlling the spray of the nozzles electromechanically, other means could be substituted such as a mechanical drive or pump.

It will thus be seen that through the present invention there is provided an apparatus which can assemble flexible tubing to a rigid commodity member without the use of adhesives or solvents. The apparatus employs a unique action of the jaw members to result in uniform stretching of the tubing and thereby provide a secure fitment as well as one that can be effected with a large number of parts. The apparatus is of a sturdy construction and thus assures a long life and dependable use.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

What is claimed is:

1. An assembly apparatus for securing a length of flexible tubing having a predetermined internal diameter to a tubular portion having an external diameter larger than said predetermined internal diameter comprising:
   a multiplicity of jaw members each having a longitudinal portion dimensioned to fit within said length of flexible tubing;
   means to radially guide said jaw members from a closed position to a position spaced therefrom while maintaining a parallel relationship with respect to the jaw members;
   means operatively associated with said jaw members to move said jaw members from said closed position to said spaced apart position; and
   means positioned adjacent said jaw members to introduce a cooling media having a temperature to temporarily freeze said length of tubing in an expanded state when contacted with said jaws in said spaced apart position.

2. The assembly apparatus as defined in claim 1 wherein said means to radially guide said jaw members from a closed position to a position spaced therefrom comprises:
   a slotted guide plate;
   a bar member for each said jaw member constructed and arranged for reciprocal movement in said slotted guide plate; and
   means to mount each said jaw member to said bar member.

3. The assembly apparatus as defined in claim 2 wherein said jaw members are defined by a body section having a large dimensional portion and a small dimensional portion and further includes a block member defining said means to mount said jaw member to said bar member with said large dimensional portion contiguous with said block member and positioned transversely thereto.

4. The assembly apparatus as defined in claim 3 wherein four of said jaw members are operatively connected to four bar members with each jaw member having a pie-shaped configuration.

5. The assembly apparatus as defined in claim 2 wherein said means to move said jaw members from said closed to said spaced apart position comprises in part:
   a crank arm; and
   a drive head operatively associated with said crank arm and said bar members to move said bar members away from each other when said crank arm is rotated.

6. The assembly apparatus as defined in claim 5 wherein said means to move said jaw members from said closed to said spaced apart position further includes air cylinder means operatively connected to said crank arm.

7. The assembly apparatus as defined in claim 3 further including biasing means operatively associated with each said bar member to bias said jaw member to a closed position.

8. The assembly apparatus as defined in claim 3 wherein said means positioned adjacent said jaw members to introduce a cooling media is defined by oppositely positioned nozzle members.

9. The assembly apparatus as defined in claim 8 further including a source of carbon dioxide interconnected to said means to introduce a cooling media.

10. The assembly apparatus as defined in claim 9 further including a vent shroud operatively positioned above said nozzle members.

* * * * *